United States Patent

Ng

[11] Patent Number: 5,906,450
[45] Date of Patent: May 25, 1999

[54] SHORT IN-LINE TURNBUCKLE

[76] Inventor: Gim Shek Ng, 213 Oak La., Yorktown, Va. 23693

[21] Appl. No.: 08/883,834

[22] Filed: Jun. 27, 1997

[51] Int. Cl.$^6$ .................................................. F16B 21/00
[52] U.S. Cl. .............................. 403/46; 403/43; 403/362; 403/22
[58] Field of Search ................... 403/43, 44, 45, 403/46, 47, 48, 78, 79, 362, 164, 165, 22; 29/896.7

[56] References Cited

U.S. PATENT DOCUMENTS

| | | |
|---|---|---|
| 248,193 | 10/1881 | Merriman . |
| 925,448 | 6/1909 | Boyden . |
| 2,420,364 | 5/1947 | Espenas . |
| 2,444,666 | 7/1948 | Orain . |
| 2,644,702 | 7/1953 | Graham ...................................... 403/43 |
| 2,736,581 | 2/1956 | Ricks ......................................... 403/43 |
| 3,938,822 | 2/1976 | Guerriero ............................... 403/44 X |
| 4,198,174 | 4/1980 | Borowiec . |
| 4,641,986 | 2/1987 | Tsui et al. .............................. 403/78 X |
| 5,248,176 | 9/1993 | Fredriksson ......................... 403/164 X |
| 5,272,788 | 12/1993 | Gilstrap ................................ 403/22 X |
| 5,702,196 | 12/1997 | Petercsak .............................. 403/43 X |

FOREIGN PATENT DOCUMENTS 2310152  9/1974  Germany ................................. 403/43

*Primary Examiner*—Anthony Knight
*Assistant Examiner*—John R. Cottingham
*Attorney, Agent, or Firm*—Wallace J. Nelson

[57] ABSTRACT

A short in-line turnbuckle having telescoping threaded parts and including grip screw locking structure to apply frictional forces to prevent relative rotation of the turnbuckle parts once the turnbuckle is adjusted to the desired length. In one embodiment a swivel connector element is provided for the turnbuckle. In another embodiment, a set screw acts against a threaded bolt of the turnbuckle structure while a separate lock screw provides a frictional force on separated sidewall portions of the turnbuckle to selectively prevent relative rotation of the threaded turnbuckle parts.

3 Claims, 2 Drawing Sheets

SHORT IN-LINE TURNBUCKLE

FIELD OF THE INVENTION

This invention relates generally to turnbuckles and relates specifically to in-line turnbuckles useful in limited available space applications.

BACKGROUND OF THE INVENTION

Turnbuckles are important tools in connecting, and providing tight and adjustable length, line and cable connections in numerous applications. Most commercially available turnbuckles are several inches in length and do not provide a locking feature to prevent subsequent turning of the component parts that lead to loosened lines or cables and formation of line or cable tangles.

It is an object of the present invention to provide a short in-line turnbuckle assembly that is operable in limited space available environments.

Another object of the present invention is to provide positive locking structure for a turnbuckle to prevent subsequent turning of the components parts when in use in a cable or line tightening operation.

A further object of the present invention is a short in-line turnbuckle having telescoping parts to provide maximum extension and collapse thereof.

SUMMARY OF THE INVENTION

According to the present invention, the foregoing and additional objects are attained in the preferred embodiment of the invention by providing a turnbuckle including a longitudinally extending hollow body having a first internally threaded portion at a first end thereof and a second internally threaded portion at a second end thereof. First and second end ring structures are connected to the longitudinal hollow body. The first ring structure includes an integral longitudinal extending tubular extension having external threads thereon mating with the first internally threaded portion of the hollow body. A second ring structure, at the second end of the longitudinal hollow body, includes an integral elongated solid rod member having external threads thereon mating with the internal threads on the integral tubular extension of the first ring structure. When the turnbuckle is at minimum length the solid rod member extends partially within the first end ring structure. The longitudinal hollow body is provided with a gap or separation of the sidewall thereof extending along the entire length thereof. An adjustment screw is provided at each end of the longitudinal hollow body with each screw extending from the edges of the separated sidewall, and across the gap in the hollow body, to permit application of a frictional force or locking of the contained threaded tubular extension and elongated solid rod members.

In a modified embodiment, the second ring member is replaced with a swivel and the connection between the tubular extension of the first ring structure and the swivel is provided by a threaded bolt slidably extending through the base of the swivel.

In another embodiment of the invention, the longitudinal hollow body is formed of two tubular telescoping members with the external portion being provided with a transverse opening therethrough and a gap formed between one surface of this opening and an end of the member. A single adjustment screw is employed for locking of the contained threaded parts of the turnbuckle against further relative rotation when set. An additional set screw is also provided to provide friction force onto the solid threaded bolt member and assist in preventing relative turning of the component parts when the turnbuckle is adjusted to the desired position.

BRIEF DESCRIPTION OF THE DRAWINGS

A more complete appreciation of the invention and many of the attendant advantages thereof will be more readily apparent as the same becomes better understood with reference to the accompanying drawings wherein.

DETAILED DESCRIPTION

Figure 1:
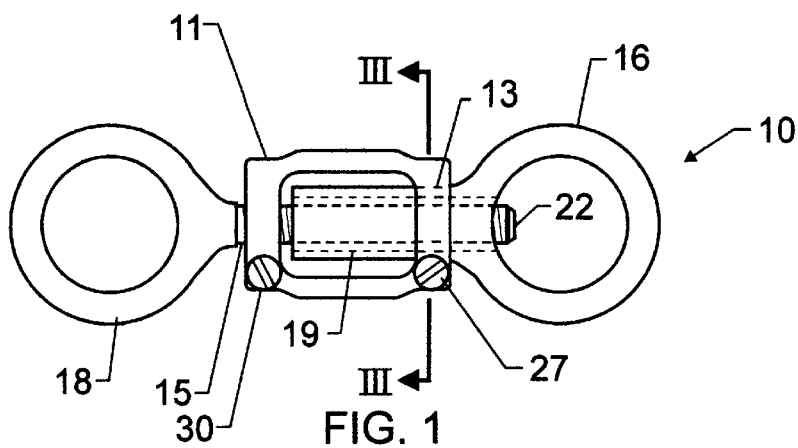
FIG. 1 is a top schematic view of the preferred embodiment of the short in-line turnbuckle according to the present invention.
Figure 3:
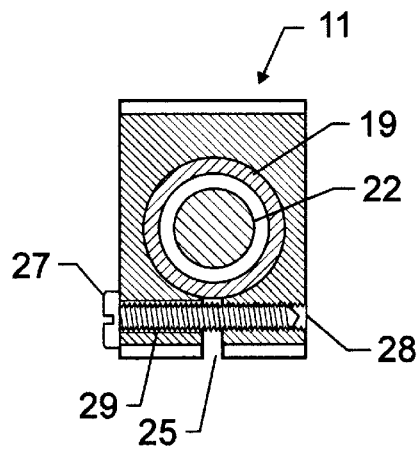
FIG. 3 is a sectional of the turnbuckle shown in FIG. 1 as seen taken along line III—III thereof.
Figure 2:
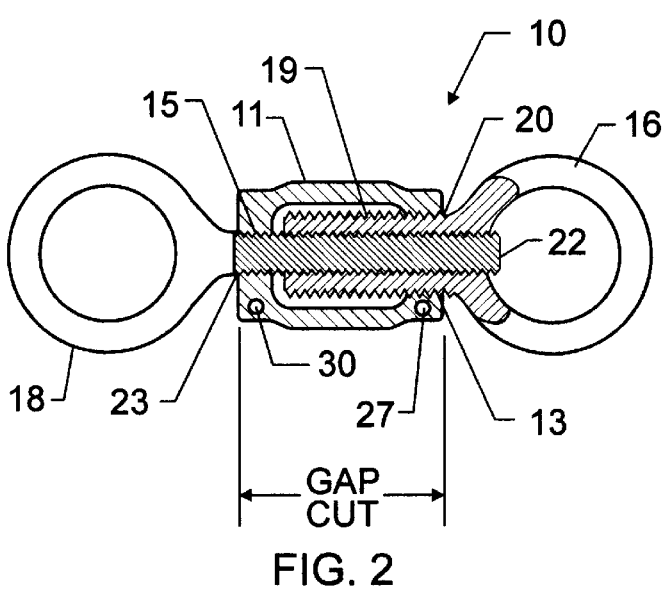
FIG. 2 is a schematic, part sectional view of the turnbuckle shown in FIG. 1.

Referring now to the drawings, and more particularly to FIGS. 1–3, the preferred embodiment of the turnbuckle of the present invention is shown and designated generally by reference numeral 10. Turnbuckle 10 includes a longitudinal extending hollow body 11 having a first internally threaded portion 13 at a first end thereof and a second internally threaded portion 15 at the opposite or second end thereof. A first end structure 16 is disposed at the first end of hollow body 11 and a second end structure 18 is disposed at the opposite, or second, end of hollow body 11. A tubular extension 19 integrally extends from first end structure 16 into hollow body 11. Tubular extension 19 is provided with external threads 20 along the entire length thereof and is threadingly connected to internal threads 13 on hollow body 11 to permit relative length adjustment of the tubular extension within body 11.

An elongated solid rod 22 integrally extends from second end structure 18 and is threadingly connected, via external threads 23 extending along substantially the entire length thereof, to the second internal threaded portion 15 of hollow body 11. The pitch of threads 23 and threaded portion 15 of hollow body 11 is, for example right handed, or opposite to the thread pitch for external threads 20 on tubular extension 19 and threaded portion 13 of hollow body 11 (left handed).

As shown more particularly in FIGS. 2 and 3, hollow body 11 is provided with a gap area 25 machined, or otherwise conventionally provided, completely through the sidewall of hollow body 11 to leave a space between the sidewall segments. A first grip screw 27 is disposed adjacent first end structure 16 and extends through bore 29 into threaded hole 28, machined in the hollow body sidewall, and across gap 25 to connect the separated portions of the hollow body sidewall at this point. A second grip screw 30 also extends across gap 25 adjacent second end structure 18 and serves to connect the separated portions of the hollow body sidewall at this point.

In operation, when turnbuckle 10 is connected to suitable line or cable and tightened to the desired extent by rotation of the reverse pitch threaded connections, grip screws 27 and 30 are tightened with a suitable screwdriver to provide a frictional lock on the threaded parts and prevent subsequent loosening of the connected parts.

Figure 4:
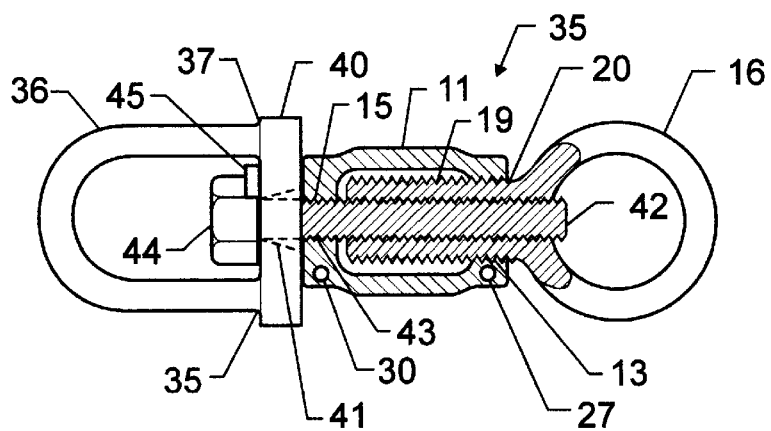
FIG. 4 is a schematic, part sectional, view of a modification of the turnbuckle shown in FIG. 1.
Figure 5:
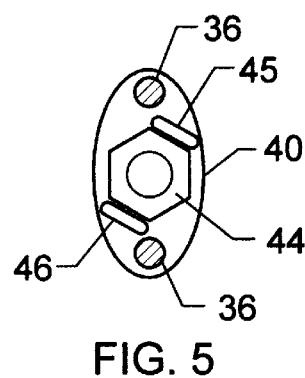
FIG. 5 is a sectional view of the turnbuckle shown in FIG. 4 as seen taken along line V—V thereof.

Referring to FIGS. 4 and 5 a modification of the turnbuckle shown in FIGS. 1–3 is shown and designated generally by reference numeral 35. In the interest of clarity, parts of turnbuckle 35 that are identical to, and perform in the same manner as that for, turnbuckle 10 are provided with the same reference numerals and will not be further described. These identical parts include elongated hollow body 11, first internal threads 13 on the first end of hollow body 11, second internal threads 15 on the second end of hollow body 11, first end structure 16, tubular extension 19 on first end structure 16, external threads 20 on tubular extension 19, and grip screws 27 and 30. In this modification second end structure 18 is replaced with a swivel structure that includes a U-clamp 36 with the ends thereof welded, or otherwise conventionally attached at points 37,38 to a base portion 40. Base portion 40 is provided with a tapered central opening 41 therethrough. An elongated bolt 42, having external threads 43 disposed along the major portion of the length thereof, is slidably disposed in tapered opening 41 of base portion 40. Threads 43 threadingly connects with internal threaded portion 15 of hollow body 11. Bolt 42 is provided with a hexagonal shaped head 44 that is disposed on the face of the base portion 40 of swivel 36 that is opposite to hollow housing 11. A pair of rotation blocks 45, 46 are welded or otherwise conventionally attached to the face of base portion 40 to contact hexagonal shaped head 44 to prevent relative rotation of bolt 42 during use of turnbuckle 35. The use of swivel end 36 on turnbuckle 35 adds versatility to the turnbuckle use. Otherwise, turnbuckle 35 preforms in the same manner as that described for turnbuckle 10.

Figure 6:
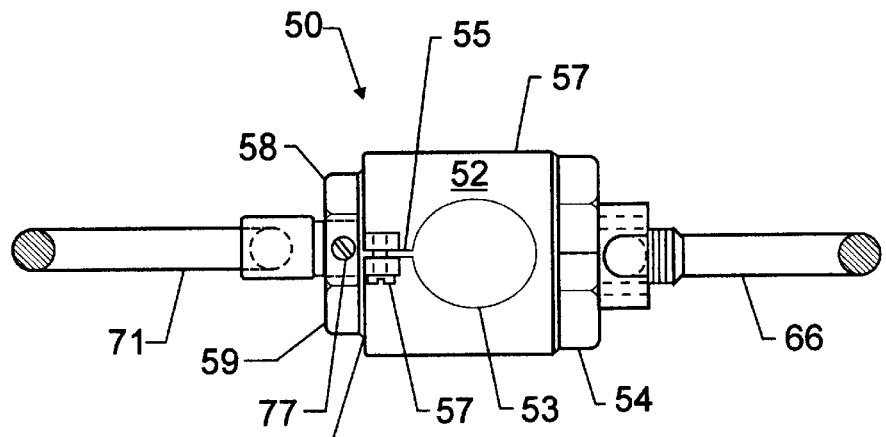
FIG. 6 is a schematic top plan view of another embodiment of the turnbuckle of the present invention.
Figure 7:
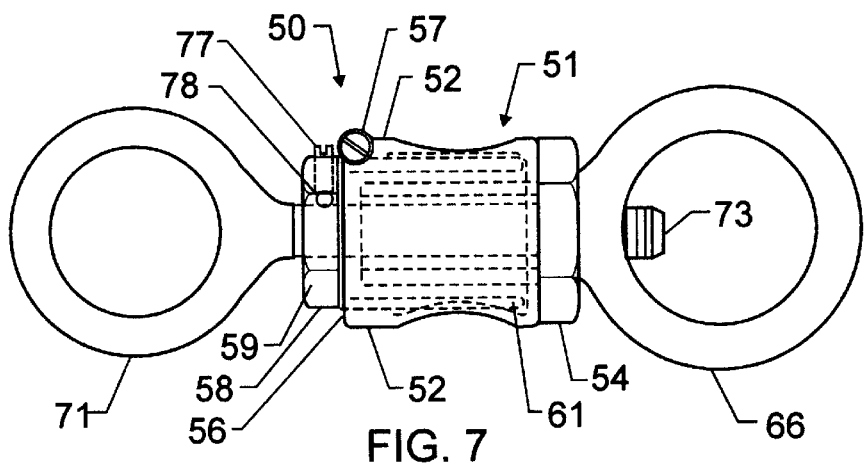
FIG. 7 is schematic side view of the turnbuckle shown in FIG. 6.
Figure 8:
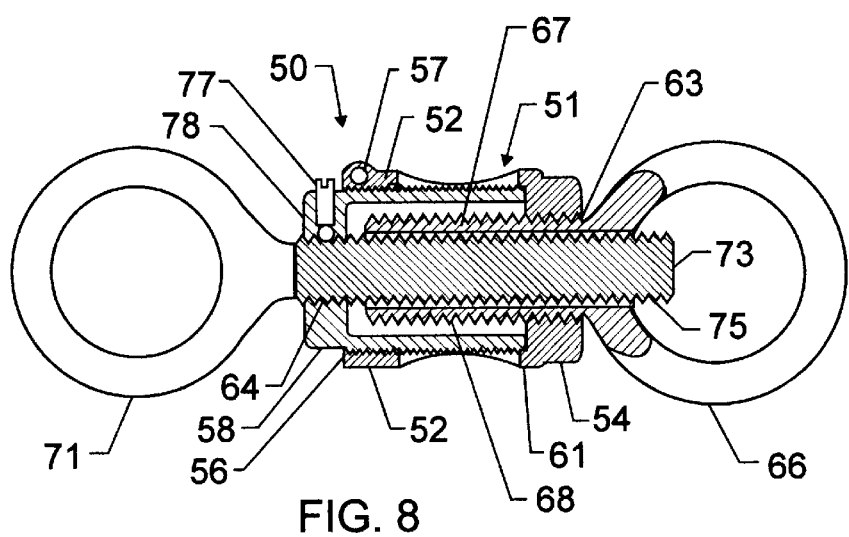
FIG. 8 is a part sectional view of the turnbuckle shown in FIGS. 6 and 7.
Figure 1:
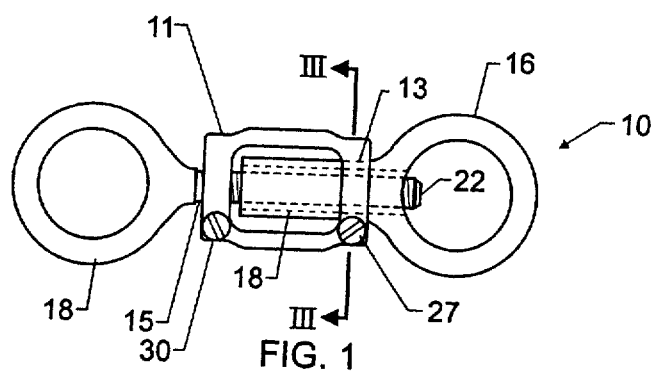
Figure 3:
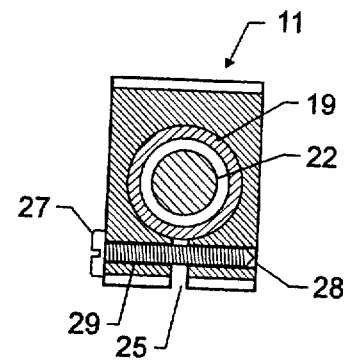
Figure 2:
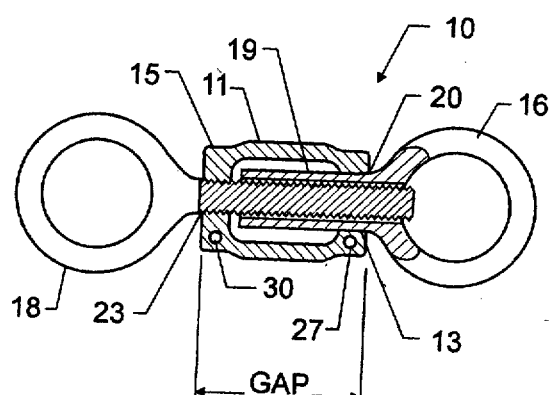
Figure 4:
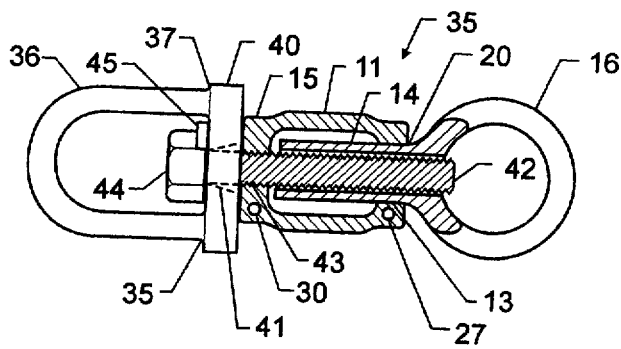
Figure 5:
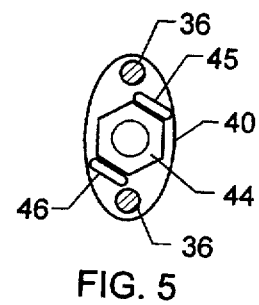

Referring now to FIGS. 6–8, another embodiment of the turnbuckle of the present invention will now be described and is designated generally by reference numeral 50. As shown therein, turnbuckle 50 includes a longitudinal extending hollow body 51. Hollow body 51 includes a first cup shaped member 52 having a hexagonal base end 54 and an open end 56; and a second cup shaped member 58 having a hexagonal base end 59 and an open end 61. First cup shaped member 52 is provided a set of internal threads 62 over a portion of the length thereof adjacent open end 56, and a second set of reverse pitch threads 68 adjacent hexagonal base end 54 thereof, as will be further explained hereinafter.

A transverse opening 53 is disposed along the major portion of the length of first cup shaped member 52. A gap 55 is provided extending through the sidewall of first cup shaped member 52 in one of the two areas separating the transverse opening 53 and the open end 56 thereof, as will be further explained hereinafter. A frame locking screw 57 extends through the separated portions of the sidewall and across gap 55 to selectively lock the turnbuckle parts against rotation, as will be further explained hereinafter.

Open end 61 of second cup shaped member 58 is telescopically received by open end 56 of first cup shaped member 52. A central threaded opening 63 is provided within hexagonal base 54 of first cup shaped member 52 and a central threaded opening 64 is provided within hexagonal base 59 of second cup shaped member 58, as will be further explained hereinafter.

A first ring shaped end structure 66 is disposed at hexagonal base end 54 of first cup shaped member 52. Ring structure 66 is provided with an integral and communicating tubular extension 67 that opens within the ring and is provided with external threads 68 over the major portion of the length thereof. Threads 68 threadingly connect tubular extension 67 with threads 63 formed in the central threaded opening in base 54 of first cup shaped member 52. Additional internal threads 62 are provided at the area of first cup shaped member 52 adjacent the open end thereof as will be further explained hereinafter.

A second ring shaped end structure 71 is disposed at hexagonal base end 59 of second cup shaped member 58. Ring structure 71 is provided with an integral elongated solid rod 73 extending therefrom and colinearly disposed relative to the central threaded opening 64 extending through the base end of second hollow cup shaped member 58. Elongated solid rod 73 is provided with exterior threads 75 over substantially its entire length, which threadingly connect with internal threaded opening 64 in hexagonal base 59 of second cup shaped member 58, as will be further explained hereinafter.

As described hereabove, frame locking screw 57 extends across gap 55 to connect separated sidewall portions of first cup shaped member 52. When turnbuckle 50 is connected to a line or cable and tightened to the extent desired by relative rotation of the respective reverse pitch threaded parts, frame locking screw 57 is tightened by use of a conventional screw driver to apply a force urging the separated sidewall portions of first cup shaped member 52 toward each other and thereby provide a frictional locking force to prevent further relative rotation between the threaded parts.

An additional locking force to prevent selective relative rotation between the threaded parts is provided by set screw 77. Set screw 77 extends through a threaded transverse opening (not designated) extending through one of the faces of hexagonal base 59 of second cup shaped member 58 into central threaded opening 64 therein. A soft thread protection material such as, for example, a nylon plug 78 is disposed at the end of set screw 77 to prevent direct contact between the screw 77 and threads 75 on solid rod member 73. Thus, when it is desired to employ set screw 77 to lock relative rotation between solid rod member 73 and second cup shaped member 58, set screw 77 is tightened (with a conventional screw driver) to apply a frictional force on threads 75 of rod member 73 through the compressed thread protecting plug 78.

The operation of the embodiment of FIGS. 6–8 is now believed apparent. When ring end structures 66 and 71 are employed to connect ends of a cable or line that needs tightening, relative rotation force is applied, through the use of suitable end wrenches, to the hexagonal base portions 54 and 59 of respective cup shaped members 52 and 58. The reverse pitch threaded connections between the end portions of the turnbuckle cause expansion or reduction of the turnbuckle length and thus, tighten or loosen the attached line or cable connected thereto. When the desired cable or line tightness is achieved, one or both of frame set screw 57 and set screw 77 are tightened to prevent further relative rotation between the turnbuckle parts.

No specific material have been discussed for construction the turnbuckle of the present invention, it being understood that any material having the necessary strength and durability requirements for the purpose intended may be employed in practice of the present invention. These materials include, but are not limited to metals, durable plastics and composites, or a combination of these. The turnbuckle component parts may be machined, molded or otherwise conventionally fabricated. In a specific embodiment, turnbuckle 10 was machined from aluminum alloy stock.

Also, the turnbuckles of the present invention are intended, but are not confined, for use in cramped or limited space conditions, with generous latitude for adjustment. In a specific embodiment of the present invention turnbuckle 10 had an overall length of slightly over three inches when collapsed to its minimum length, but was expandable to an additional two inches when extended to its maximum length.

Although the invention has been described relative to specific embodiments thereof, it is not so limited and there are numerous variations and modifications of the invention that will be readily apparent to these skilled in the art in the light of the above teachings. It is therefore to be understood that, within the scope if the appended claims, the invention may be practiced other than is specifically described herein.

What is claimed as new and desired to be secured by Letters Patent of the United States is:

1. A turnbuckle comprising:

a longitudinal extending hollow body;

said longitudinal extending hollow body including a first hollow cup shaped member having a base end and an open end, and a second hollow cup shaped member threadingly received by said first hollow cup shaped member;

said second hollow cup shaped member being also provided with a base end and an open end with the open end of said second hollow cup shaped member extending through said open end of said first hollow cup shaped member;

said base end of both said first hollow cup shaped member and said second hollow cup shaped member being provided with a hexagonal exterior surface;

a central threaded opening extending through said base end of both said first and said second hollow cup shaped members;

a first end structure disposed at said base end of said first hollow cup shaped member and including a first ring shaped end and a tubular extension member integral with said first ring shaped member and co-linearly disposed relative to said central threaded opening extending through said base end of said first hollow cup shaped member;

said tubular extension being provided with external threads along substantially the entire length thereof;

said external threads on said tubular extension being threadingly connected to said central threaded opening extending through said base end of said first hollow cup shaped member;

a second end structure disposed at said base end of said second hollow cup shaped member and including a second ring shaped end and an elongated solid rod integral with said second ring shaped end and co-linearly disposed relative to said central threaded opening extending through said base end of said second hollow cup shaped member;

said elongated solid rod being provided with external threads along substantially the entire length thereof;

said external threads on said elongated solid rod being threadingly connected to said central threaded opening extending through said base end of said second hollow cup shaped member;

first means for locking relative rotative movement between said first and said second end structures and second means for locking relative rotation between said tubular extension integral with said first ring shaped end and said elongated solid rod extending from said second ring shaped end.

2. The turnbuckle of claim 1 wherein said first means for locking relative rotative movement between said first and said second end structures includes:

said first hollow cup shaped member being provided with a transverse opening extending completely therethrough to provide a pair of openings through the sidewall of said first hollow cup shaped member disposed 180 degrees relative to each other and positioned substantially intermediate said base end and said open end thereof, a gap provided through the sidewall of said first hollow cup shaped member and extending from one of said pair of openings formed through the sidewall of said first hollow cup shaped member transverse opening to said open end of said first hollow cup shaped member; and a locking screw extending through the sidewall of said first cup shaped member across said gap to direct a force between the separated portions of the sidewall and thereby lock said first and said second end structures against relative movement.

3. The turnbuckle of claim 1 wherein said second means for locking relative rotation between said tubular extension integral with said first ring shaped end and said elongated solid rod extending from said second ring shaped end includes:

a transverse threaded opening provided through one side of said hexagonal exterior surface and into said central threaded opening extending through said base end of said second hollow cup shaped member, a set screw disposed within said transverse threaded opening;

a thread protective material disposed within said transverse opening and adapted to be contacted by said set screw and said external threads on said elongated solid rod extending through said base end of said second hollow cup shaped member;

said thread protective material being compressed upon tightening of said set screw to thereby provide a frictional force on said elongated solid rod through said thread protective material and lock relative rotation between said tubular extension integral with said first end ring and said elongated solid rod extending from said second ring shaped end.

* * * * *

UNITED STATES PATENT AND TRADEMARK OFFICE
CERTIFICATE OF CORRECTION

PATENT : 5,906,450

DATED : May 25, 1999

INVENTOR(S) : Gim Shek Ng

It is certified that error appears in the above-identified patent and that said Letters Patent is hereby corrected as shown below:

In the Drawings:

Figures 2 and 4 should be deleted and replaced with the attached sheet consisting of Figures 2 and 4.

Signed and Sealed this

Twenty-ninth Day of August, 2000

*Attest:*

Q. TODD DICKINSON

*Attesting Officer*  *Director of Patents and Trademarks*